United States Patent
Shahriari et al.

(10) Patent No.: US 12,420,787 B2
(45) Date of Patent: Sep. 23, 2025

(54) SYSTEM AND METHOD FOR ROAD GROOVE DETECTION AND CONTROL IN AUTOMATED DRIVING

(71) Applicant: GM Global Technology Operations LLC, Detroit, MI (US)

(72) Inventors: Mohammadali Shahriari, Markham (CA); Mehdi Abroshan, Waterloo (CA); Mohammed Raju Hossain, Markham (CA); Ashraf Abualfellat, Grand Blanc, MI (US); Brian Porto, Wixom, MI (US); Christopher Ratliff, Linden, MI (US); Sadaf Mohammadi, Toronto (CA)

(73) Assignee: GM Global Technology Operations LLC, Detroit, MI (US)

(*) Notice: Subject to any disclaimer, the term of this patent is extended or adjusted under 35 U.S.C. 154(b) by 39 days.

(21) Appl. No.: 18/414,896

(22) Filed: Jan. 17, 2024

(65) Prior Publication Data

US 2025/0229775 A1    Jul. 17, 2025

(51) Int. Cl.
*B60W 30/10* (2006.01)
*B60W 40/06* (2012.01)

(52) U.S. Cl.
CPC ............ *B60W 30/10* (2013.01); *B60W 40/06* (2013.01); *B60W 2510/105* (2013.01); *B60W 2510/207* (2013.01); *B60W 2552/00* (2020.02); *B60W 2555/00* (2020.02)

(58) Field of Classification Search
CPC ............ B60W 30/10; B60W 2552/00; B60W 2510/105; B60W 2510/207; B60W 40/06; B60W 2555/00
See application file for complete search history.

(56) References Cited

U.S. PATENT DOCUMENTS

| | | | |
|---|---|---|---|
| 2020/0398630 A1* | 12/2020 | Sohn | B60W 40/06 |
| 2023/0150492 A1* | 5/2023 | Flumm | B62D 6/04 |
| | | | 701/25 |
| 2025/0065894 A1* | 2/2025 | Luo | B60W 50/0205 |

FOREIGN PATENT DOCUMENTS

| | | |
|---|---|---|
| DE | 102016001776 A1 | 8/2016 |
| DE | 102016207436 A1 | 11/2017 |
| DE | 102017206484 A1 | 10/2018 |
| DE | 102017212707 A1 | 1/2019 |
| DE | 102019212668 A1 | 2/2021 |
| DE | 102021209131 A1 | 2/2023 |

* cited by examiner

*Primary Examiner* — Jacob M Amick
(74) *Attorney, Agent, or Firm* — Honigman LLP; Matthew H. Szalach; Jonathan P. O'Brien (57) ABSTRACT

A computer-implemented method that, when executed by data processing hardware of a vehicle, causes the data processing hardware to perform operations is provided. The operations include gathering sensor data, calculating one or more groove detection confidence values with the sensor data using one or more groove detection modules, evaluating the one or more groove detection confidence values using a road groove detection fusion module, determining whether a road groove is detected, communicating road groove data to an advanced driver-assistance system, and adapting trajectory and steering controls of the vehicle.

20 Claims, 7 Drawing Sheets

SYSTEM AND METHOD FOR ROAD GROOVE DETECTION AND CONTROL IN AUTOMATED DRIVING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a method of detecting road conditions and controlling steering of a vehicle accordingly.

Many vehicles include an advanced driver assistance system (ADAS) which can aid drivers with operating a vehicle. One example of an ADAS system is a Lane Keep Assist System (LKAS). LKAS may be used to help maintain the trajectory of the vehicle as it travels down the road and to help keep the vehicle in its lane. Lateral controls and lane centering performance may be affected by grooved or otherwise patterned areas in the road which may result in lateral forces on the tires, for example. Thus, it may be desirable to detect these areas and adapt controls of the vehicle to effectively maintain acceptable trajectory following.

SUMMARY

In one configuration, a computer-implemented method that, when executed by data processing hardware of a vehicle, causes the data processing hardware to perform operations is provided. The operations include gathering sensor data, calculating one or more groove detection confidence values with the sensor data using one or more groove detection modules, evaluating the one or more groove detection confidence values using a road groove detection fusion module, determining whether a road groove is detected, communicating road groove data to an advanced driver-assistance system, and adapting trajectory and steering controls of the vehicle.

The method may include one or more of the following optional features or steps. For example, the one or more groove detection modules may include a first groove detection module which carries out the steps of measuring applied torque, measuring a road wheel angle of the vehicle, estimating a self-aligning torque, estimating a pull force, estimating an asymmetric steering parameter, estimating an asymmetric understeer coefficient, and calculating a first road groove detection confidence value. The one or more groove detection modules may include a second groove detection module which carries out the steps of measuring vehicle dynamic states, decomposing frequencies of an inertial measurement, classifying the frequencies, and calculating a second road groove detection confidence value. The one or more groove detection modules may include a third groove detection module which carries out the steps of recording sound in a vehicle environment, establishing a circular buffer of the data, decomposing frequencies of the recorded sound, classifying the frequencies, and calculating a third road groove detection confidence value. The first, second, and third road groove detection confidence values may be evaluated using a road groove detection fusion module to determine whether a road groove is present. One or more of the first, second, and third road groove detection confidence values may be evaluated to determine whether a road groove is present. Adapting the trajectory and steering controls of the vehicle may further include the steps of decomposing frequencies of a trajectory error adapting feedback control, tracking steady state response, tracking transient response, and adjusting the transient response with micro adjustments.

In another configuration, a system including data processing hardware and memory hardware in communication with the data processing hardware is provided. The memory hardware storing instructions that, when executed on the data processing hardware, cause the data processing hardware to perform operations. The operations include gathering sensor data, calculating one or more groove detection confidence values with the sensor data using one or more groove detection modules, evaluating the one or more groove detection confidence values using a road groove detection fusion module, determining whether a road groove is detected, communicating road groove data to an advanced driver-assistance system, and adapting trajectory and steering controls of the vehicle.

The system may include one or more of the following features or steps. The one or more groove detection modules may include a first groove detection module which carries out the steps of measuring applied torque, measuring a road wheel angle of the vehicle, estimating a self-aligning torque, estimating a pull force, estimating an asymmetric steering parameter, estimating an asymmetric understeer coefficient, and calculating a first road groove detection confidence value. The one or more groove detection modules may include a second groove detection module which carries out the steps of measuring vehicle dynamic states, decomposing frequencies of an inertial measurement, classifying the frequencies, and calculating a second road groove detection confidence value. The one or more groove detection modules may include a third groove detection module which carries out the steps of recording sound in a vehicle environment, establishing a circular buffer of the data, decomposing frequencies of the recorded sound, classifying the frequencies, and calculating a third road groove detection confidence value. The first, second, and third road groove detection confidence values may be evaluated using a road groove detection fusion module to determine whether a road groove is present. One or more of the first, second, and third road groove detection confidence values may be evaluated to determine whether a road groove is present. Adapting the trajectory and steering controls of the vehicle further comprises the steps of decomposing frequencies of a trajectory error, adapting feedback control, tracking steady state response, tracking transient response, and adjusting the transient response with micro adjustments.

In yet another configuration, a vehicle management system is provided and includes a sensor system comprising one or more sensors for gathering sensor data, a road groove detection system, an advance driver-assistance system, data processing hardware, and memory hardware in communication with the data processing hardware, the memory hardware storing instructions that, when executed on the data processing hardware, cause the data processing hardware to perform operations. The operations include gathering sensor data, calculating one or more groove detection confidence values with the sensor data using one or more groove detection modules, evaluating the one or more groove detection confidence values using a road groove detection fusion module, determining whether a road groove is detected, communicating road groove data to an advanced driver-assistance system, and adapting trajectory and steering controls of the vehicle.

The vehicle management system may include one or more of the following features or steps. For example, the one or more groove detection modules may include a first groove detection module which carries out the steps of measuring applied torque, measuring a road wheel angle of the vehicle, estimating a self-aligning torque, estimating a pull force, estimating an asymmetric steering parameter, estimating an asymmetric understeer coefficient, and calculating a first road groove detection confidence value. The one or more groove detection modules may include a second groove detection module which carries out the steps of measuring vehicle dynamic states, decomposing frequencies of an inertial measurement, classifying the frequencies, and calculating a second road groove detection confidence value. The one or more groove detection modules may include a third groove detection module which carries out the steps of recording sound in a vehicle environment, establishing a circular buffer of the data, decomposing frequencies of the recorded sound, classifying the frequencies, and calculating a third road groove detection confidence value. One or more of the first, second, and third road groove detection confidence values may be evaluated to determine whether a road groove is present. Adapting the trajectory and steering controls of the vehicle further comprises the steps of decomposing frequencies of a trajectory error, adapting feedback control, tracking steady state response, tracking transient response, and adjusting the transient response with micro adjustments.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 1A:
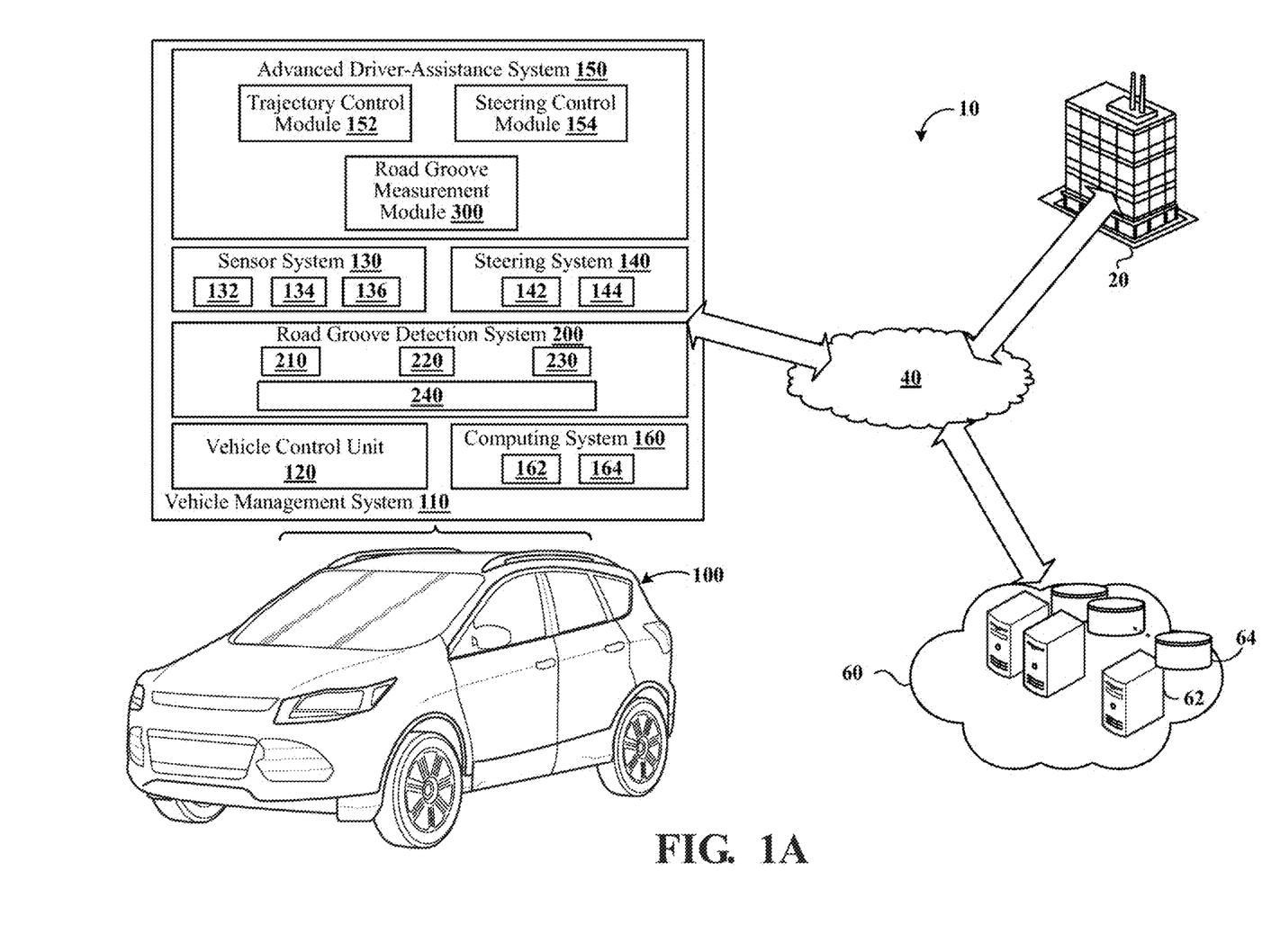
FIG. 1A is a schematic diagram of a vehicle environment including a vehicle management system according to the principles of the present disclosure.
Figure 1B:
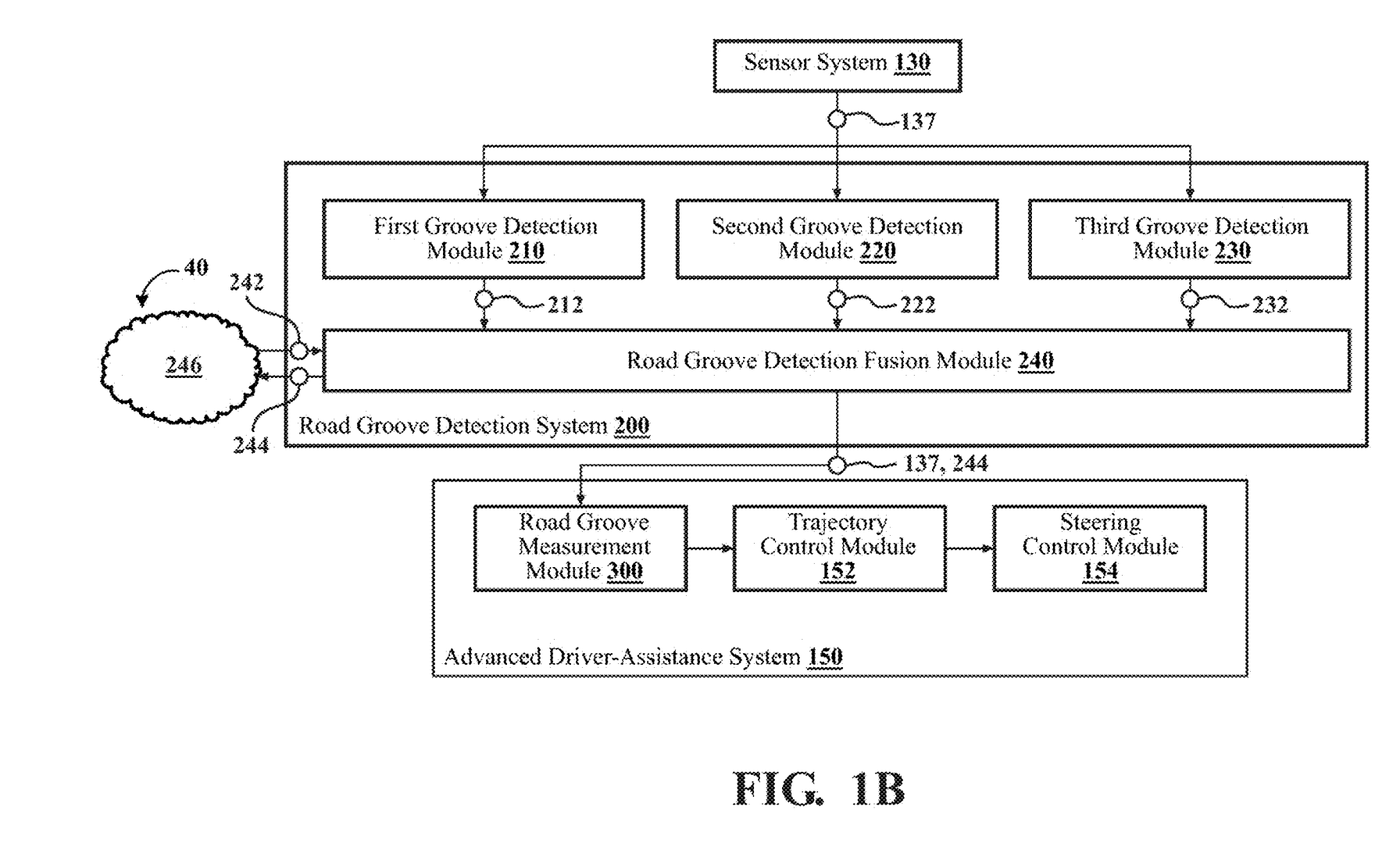
FIG. 1B is a more detailed schematic of the vehicle management system comprising a sensor system, a road groove detection system, and an advanced driver-assistance system according to principles of the present disclosure.

Referring to FIGS. 1A and 1B, an example vehicle operating environment 10 is provided for illustration of the principles of the present disclosure. The vehicle operating environment 10 includes a vehicle 100 and a vehicle monitoring center 20. For the sake of illustration, the vehicle operating environment 10 is shown as including a single vehicle monitoring center 20. However, in other examples, the vehicle operating environment 10 may include a plurality of vehicle monitoring centers 20 in communication with the vehicle 100 over a network 40 (e.g., the Internet, cellular networks). The vehicle monitoring center 20 may include a remote facility or system that receives and monitors diagnostic data and sensor data from the vehicle 100 to determine one or more vehicle operating conditions.

The vehicle 100 includes a vehicle management system 110 including a vehicle control unit (VCU) 120, a sensor system 130, a vehicle steering system 140, an advanced driver-assistance system (ADAS) 150, a computing system 160, and a road groove detection system 200. The vehicle control unit 120 is generally responsible for most processes related to the operation of the vehicle 100. For example, the vehicle control unit 120 may generate various outputs based on inputs at the sensor system 130, including driver-applied torque, vibration on the vehicle steering system 140, road wheel angle, and external sound/audio.

While the vehicle 100 maneuvers about the environment 10, the sensor system 130 includes various sensor subsystems 132, 134, 136 configured to gather sensor data 137 relating to operating characteristics of the environment 10 and/or status of the vehicle 100. For instance, the sensor subsystems 130 include an exterior sensor subsystem 132 configured to measure or obtain external environmental data 137, such as weather or external audio (e.g., sound that results from the vehicle 100 traveling on different surfaces), an interior sensor subsystem 134 configured to measure interior environmental data 137, such as vibration or sound within the cabin of the vehicle 100, and/or an ADAS sensor system 136 configured to measure or obtain vehicle operating data (i.e., sensor data 137) for the ADAS 150, which may include sensor data from the steering system 140, such as driver-applied torque to a steering column 142, vibration of the steering system 140, and road wheel angle, for example. In the present disclosure, the ADAS sensor system 136 includes at least one vibration sensor, at least one torque sensor, and an integrated measurement unit (IMU), for example. Particularly, the vibration sensor (e.g., a microphone) can be incorporated on a housing of the steering column 142, or otherwise coupled to the steering column 142, and may be configured to measure vibrations of the steering column 142 and other components of the vehicle 100. The torque sensor can be incorporated on a housing of the steering column 142 or otherwise coupled to the steering column 142 and can be configured to measure steering moment, angle of rotation (i.e., steering angle), and angular speed (i.e., steering speed) of the steering column 142. The integrated measurement unit (IMU) can be located in the vehicle 100 and may consist of one or more accelerometers and gyroscopes for measuring vehicle acceleration in different directions, an inertial measurement, and a yaw rate, for example. Additionally or alternatively, the vibration sensor, the torque sensor, and the integrated measurement unit may include one or more sensors located in other areas of the vehicle 100.

As the sensor system 130 gathers the sensor data 137, the computing system 160 is configured to store, process, and/or communicate the sensor data 137 within the vehicle operating environment 10. In order to perform computing tasks related to the sensor data 137, the computing system 160 of the vehicle 100 includes data processing hardware 162 and memory hardware 164. The data processing hardware 162 is configured to execute instructions stored in the memory hardware 164 to perform computing tasks related to operation and management of the vehicle 100. Generally speaking, the computing system 160 refers to one or more locations of data processing hardware 162 and/or memory hardware 164.

In some examples, the computing system 160 is a local system located on the vehicle 100 (e.g., vehicle control unit). When located on the vehicle 100, the computing system 160 may be centralized (i.e., in a single location/area on the vehicle 100, for example, a vehicle control unit), decentralized (i.e., located at various locations about the vehicle 100), or a hybrid combination of both (e.g., with a majority of centralized hardware and a minority of decentralized hardware). To illustrate some differences, a decentralized computing system 160 may allow processing to occur at an activity location while a centralized computing system 160 may allow for a central processing hub that communicates to systems located at various positions on the vehicle 100.

Additionally or alternatively, the computing system 160 includes computing resources that are located remotely from the vehicle 100. For instance, the computing system 160 may communicate via the network 40 with a remote vehicle computing system 60 (e.g., a remote computer/server or a cloud-based environment). Much like the computing system 160, the remote vehicle computing system 60 includes remote computing resources such as remote data processing hardware 62 and remote memory hardware 64. Here, sensor data 137 or other processed data (e.g., data processing locally by the computing system 160) may be stored in the remote vehicle computing system 60 and may be accessible to the computing system 160. In some examples, the computing system 160 is configured to utilize the remote resources 62, 64 as extensions of the computing resources 162, 164 such that resources of the computing system 160 may reside on resources of the remote vehicle computing system 60.

Referring now to FIG. 1B, the road groove detection system 200 and the corresponding operation thereof are provided in greater detail. The road groove detection system 200 is configured to receive sensor data 137 from the sensor system 130 to determine whether a road groove, a rain groove, or another surface pattern is present on the road on which the vehicle 100 is traveling. These terms (i.e., road groove, rain groove, or surface pattern) may be used interchangeably throughout the disclosure. As shown in FIG. 1B, the road groove detection system 200 comprises a first groove detection module 210, a second groove detection module 220, and/or a third groove detection module 230. Each of the first, second, and third groove detection modules 210, 220, 230 may be configured to evaluate the sensor data 137 and generate a confidence score 212, 222, 224 which may be used for determining whether a road groove exists on the road on which the vehicle 100 is traveling. Each of the first, second, and third groove detection modules 210, 220, 230 will be discussed in greater detail below. Additionally, it should be noted that while all three of these modules are described herein, the road detection system 200 may be configured to utilize all of the modules, some of the modules (i.e., two of the three), or only one of the modules during operation of the vehicle 100.

Figure 2A:
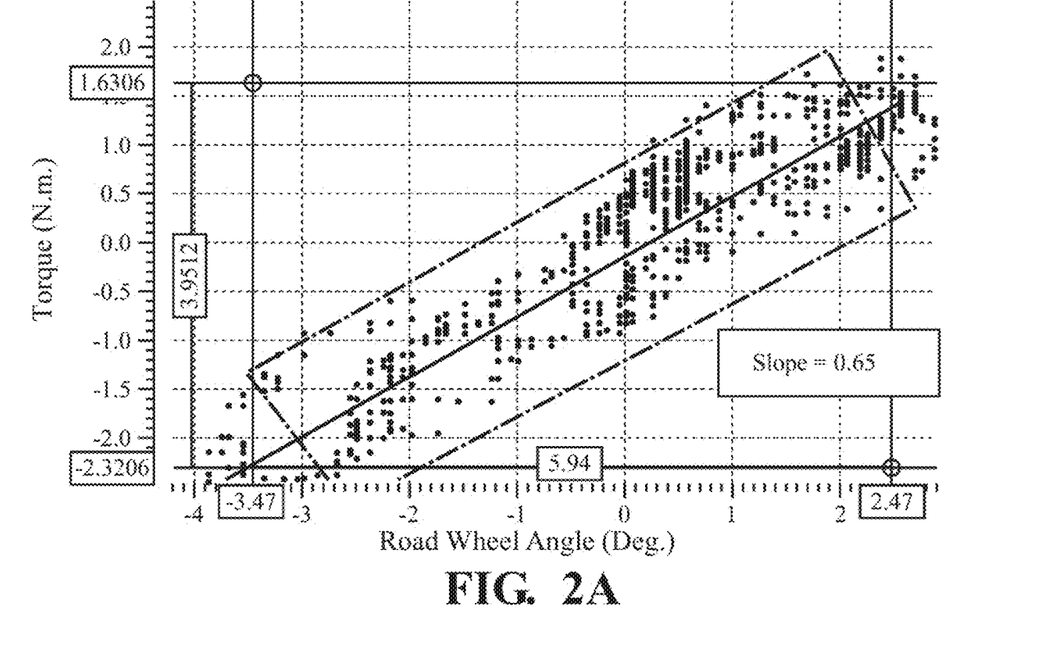
FIG. 2A is a graph showing road wheel angle versus torque according to an aspect of the present disclosure.
Figure 2B:
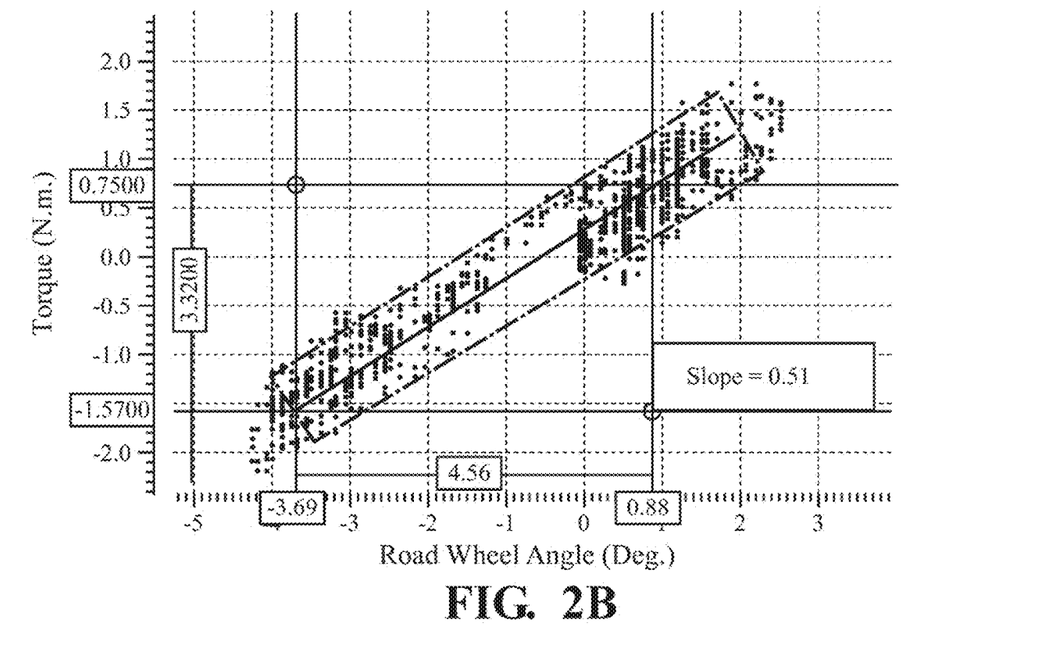
FIG. 2B is a graph showing road wheel angle versus torque according to an aspect of the present disclosure.

The first groove detection module 210 may be configured as a vehicle dynamics based module. In other words, the first groove detection module 210 may utilize data 137 from one or more of the sensor subsystems 132, 134, 136 to determine if the vehicle 100 is experiencing wander (i.e., a lateral pull or push force) due to a road groove in the road. The first groove detection module 210 may assess and/or measure applied torque on the steering system 140, whether it be from a control or as a result of a driver of the vehicle 100. The applied torque may be measured in the torque domain and may be determined using one or more sensors of the ADAS sensor system 136, for example. Additionally, the first groove detection module 210 may be configured to measure the vehicle road wheel angle (RWA). Sensor data 137 indicating RWA may be gathered using one or more sensors of the ADAS sensor system 136, for example. With reference to FIG. 2, while the vehicle 100 is traveling, it may be desirable to evaluate RWA against applied torque, as this can help indicate whether a road groove is present in the road. For instance, in the example shown in FIG. 2, the slope of RWA versus applied torque when a road groove is present is less (FIG. 2B) than when a road groove is not present (FIG. 2A). In general, as shown in this example, this is because grooves have a tendency to increase pull force in one direction that causes wandering of the wheel or steering column 142. The first groove detection module 210 may utilize the applied torque and the RWA to estimate self-aligning torque. In the present illustrative configuration, the term self-aligning torque may be used to refer to the amount of torque necessary to maintain a specific road wheel angle. Once the self-aligning torque is determined, the pull force of the road groove may be calculated, which allows the ADAS 150 to control and compensate for such force. Additional parameters that may be desirable to determine based on the self-aligning torque include an asymmetric steering parameter and an asymmetric understeer coefficient, for example. The evaluation and comparison of one or more of the above parameters of the first groove detection module 210 may be associated with the confidence value 212 and a co-variance value. For instance, with reference to FIGS. 2A and 2B, there is a variance associated with each slope. The larger the variance (i.e., more scattered data), the lower the confidence of the data. On the other hand, when there less variance, there is high confidence of the data. The confidence value 212 of the data 137 evaluated by the first groove detection module 210 may be used by itself or within a road groove detection fusion module 240 with other confidence data to determine whether a road groove is present on the road on which the vehicle 100 is traveling.

Figure 3A:
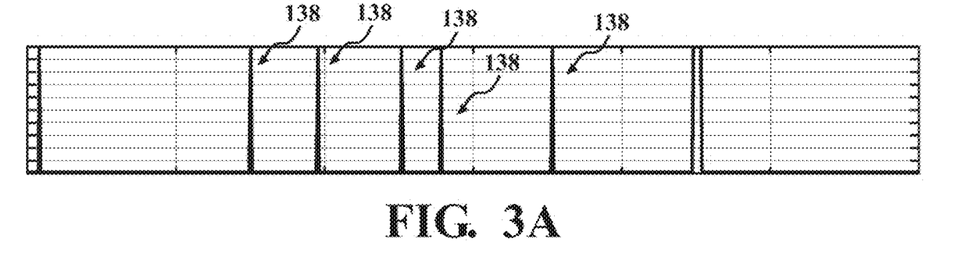
FIG. 3A is a graph showing road groove detection flag from inertial measurements of a vehicle driving on a grooved road according to an aspect of the present disclosure.
Figure 3B:
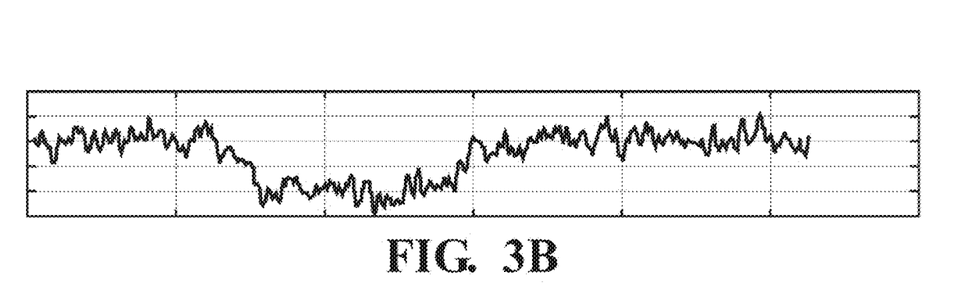
FIG. 3B is a graph showing yaw rate measurements according to an aspect of the present disclosure.
Figure 3C:
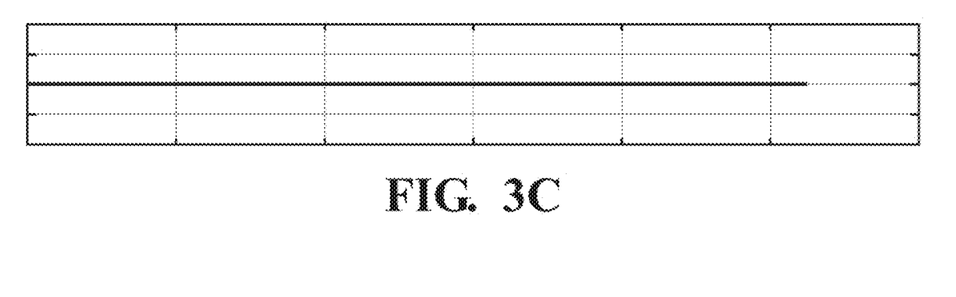
FIG. 3C is a graph showing road groove detection flag from an inertial measurements of a vehicle driving on non-grooved road according to an aspect of the present disclosure.
Figure 3D:
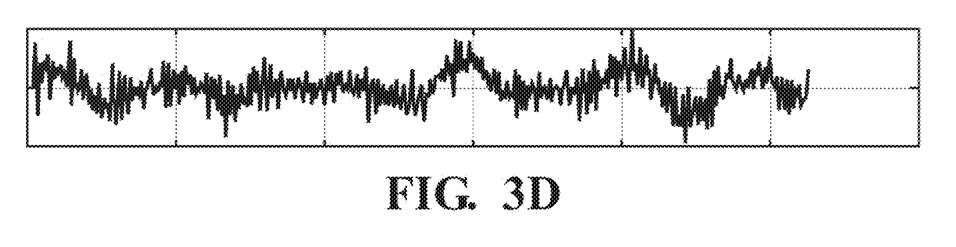
FIG. 3D is a graph showing yaw rate response according to an aspect of the present disclosure.

The second groove detection module 220 may be configured as a groove induced vibration detection module. In general, the second groove detection module 220 may be configured to evaluate sensor data 137 of the ADAS sensor system 136 and determine vehicle dynamic states (e.g., vibration induced on the vehicle 100 from a road groove). More specifically, the sensor data 137 may include the yaw rate 137a, applied torque, 137b, and the inertial measurement from the integrated measurement unit of ADAS sensor system 136. With reference to FIGS. 3A and 3B, an example of a groove induced noise detection flag (FIG. 3A) and yaw rate measurements (FIG. 3B) when a road grove is present are shown. With specific reference to FIG. 3B, an algorithm may process the yaw rate of the vehicle 100 to provide flags (i.e., indicating oscillations or noise) 138 that may be associated with a grooved pattern or grooved patch in the road. Contrary to FIGS. 3A and 3B, FIGS. 3C and 3D show an example of a groove induced noise detection flag (FIG. 3C) and yaw rate measurements (FIG. 3D) when there is no groove pattern or groove patch in the road. More specifically, FIG. 3C does not include any flags (i.e., oscillations or noise) and such result may be associated with a road that does not have a grooved pattern or grooved patch. The second groove detection module 220 may be configured to execute frequency decomposition of the inertial measurement as well as frequency classification. Similar to the first groove detection module 210, the confidence value 222 of the data 137 evaluated by the second groove detection module 220 may be provided and used by itself or within the road groove detection fusion module 240 with other confidence data to determine whether a road groove is present on the road on which the vehicle 100 is traveling.

Figure 4:
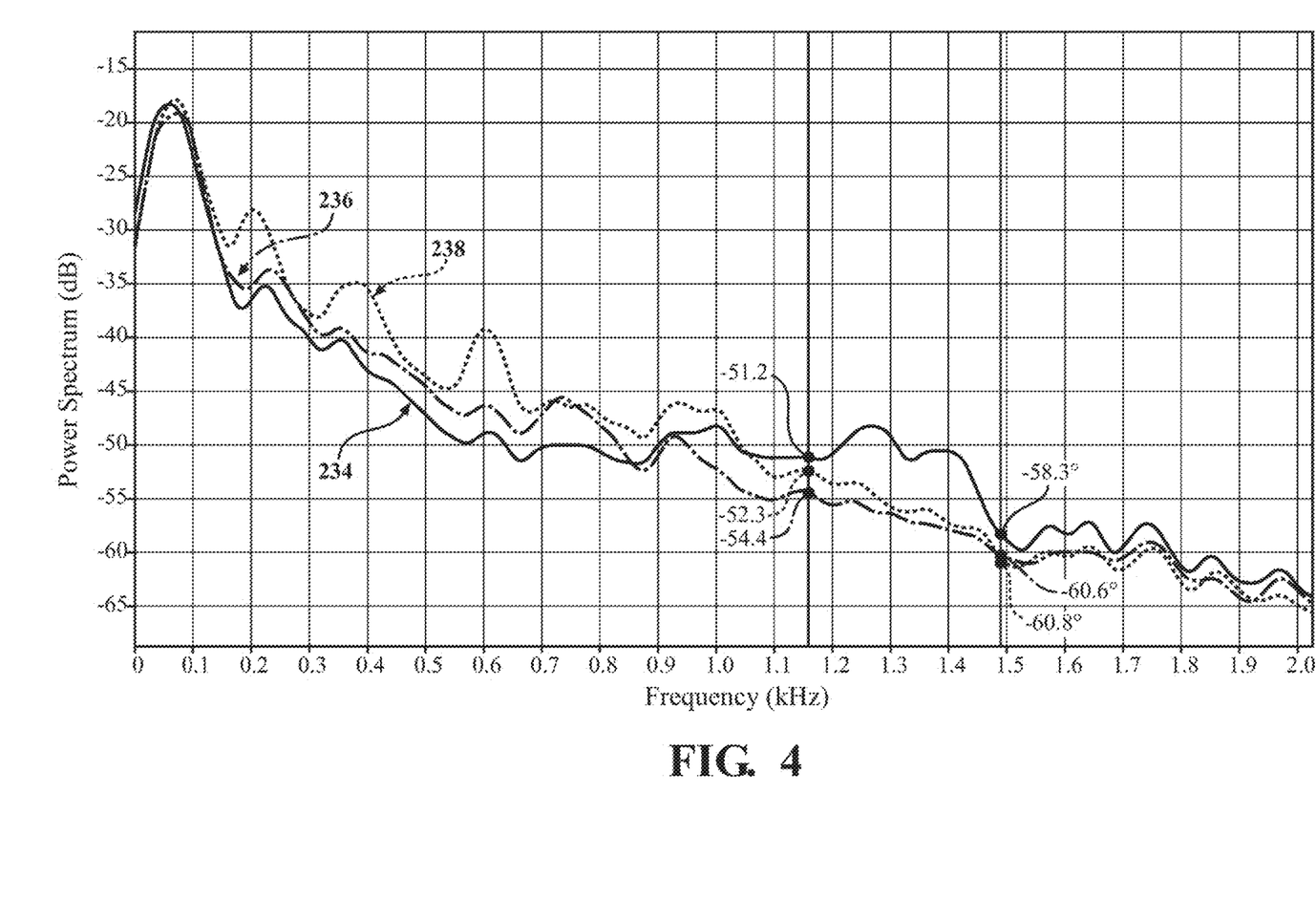
FIG. 4 is a graph showing frequency versus power for a first, second, and third road type according to an aspect of the present disclosure.

The third detection module 230 may be configured as a groove vibration sound detection module. In general, a high pitched noise is produced from the interaction between the vehicle 100 and a grooved road. The sensor system 130 can include one or more sensors configured to detect and/or record this sound. Another noise is produced from the interaction between the vehicle 100 and a non-grooved road. The sensor system 130 can include one or more sensors configured to detect and/or record this sound as well. The sensor system 130 may have a microphone coupled to the interior sensor subsystem 134 or the exterior sensor subsystem 132. Once the data 137 is gathered by sensor system 130, the third detection module 230 by be configured to create a circular buffer with the data 137 so that the data can be further evaluated. Frequency decomposition of the audio recording may be carried out after the circle buffer is created so that the road upon which the vehicle 100 is traveling may be classified based on frequency and power, for example. With reference to FIG. 4, first 234, second 236, and third 238 audio samples are plotted showing frequency (kHz) versus power (dB). The first audio sample 234 may be associated with a concrete road that does not have a road groove. The second audio sample 236 may be associated with an asphalt road that does not have a road groove. The third audio sample 238 may be associated with a road that has a road groove. Similar to the first and second groove detection modules 210, 220, the confidence value 232 of the data 137 evaluated by the third groove detection module 230 may be provided and used by itself or within the road groove detection fusion module 240 with other confidence data 212, 222 to determine whether a road groove is present.

As indicated above, the road groove detection fusion module 240 may be configured to receive and evaluate one or more confidence values 212, 222, 232 from the first, second, and/or third groove detection modules 210, 220, 230 to determine whether a road groove is present on the road on which the vehicle 100 is traveling. For example, an average of the confidence values 212, 222, 232 may be taken or another data fusion mechanism or method may be applied to the confidence values 212, 222, 232. The road groove detection fusion module 240 may also be configured to also receive historical road groove data 242 to supplement the evaluation of the confidence values 212, 222, 232 from one or more of the fusion detection modules 210, 220, 230. Upon evaluation of the confidence values 212, 222, 232 and any historical road groove data 242, the road groove detection fusion module 240 may provide road groove data 244 which indicates to one or more systems of the vehicle 100 that a road groove is detected or not. It may be desirable to upload the road groove data 244 with a Global Positioning System (GPS) location of the vehicle 100 to a road groove map 246 for a crowd source update, for example, so that the road groove information can be shared with other vehicles. Additionally, it may be desirable for the ADAS system 150 to be provided with the road groove data 244 so that the trajectory and steering controls may be monitored and adjusted accordingly. More specifically, lateral and lane centering controls can be adapted or adjusted to effectively maintain acceptable trajectory following.

With reference again to FIG. 1B, the ADAS system 150 may include a trajectory control module 152, a steering control module 154, and a road groove measurement module 300. In general, the trajectory control module 152 may be used to establish a vehicle trajectory of the vehicle 100. Likewise, the steering control module 154 may be used to communicate with the steering system 140 to adjust the steering system 140 according to the trajectory plan set forth by the trajectory control module 152. The road groove measurement module 300 may be configured receive the road groove data 244 and instruct the trajectory control module 152 and/or the steering control module 154 to modify the trajectory plan and/or the steering control of the vehicle 100.

When road groove data 244 is provided to the trajectory control module 152 and/or the steering control module 154, one or more vehicle parameters may be calculated according to the road groove so that the vehicle 100 may be controlled accordingly. In other words, the steering control module 154 may use a model based curvature when a road groove is present and a yaw rate based curvature when a road groove is not present.

According to one aspect of the present disclosure, the steering control module may be configured to estimate a steering stiffness $k_s(k+1)$ with the following equation:

$$k_s(k+1) = k_s(k) + g(k)(\tau(k) - k_s(k)\delta_f(k)) \quad (1)$$

The estimated steering stiffness can be a previously learned value of steering stiffness $k_s(k)$ added to a learning rate $g(k)$ (e.g., kalman gain or turning parameter) multiplied by the difference of requested torque $\tau(k)$ to the electronic power steering 144 and the previous learned value of steering stiffness $k_s(k)$ multiplied by a measured front steering angle $\delta_f(k)$.

According to another aspect of the present disclosure, the steering control module 154 may be configured to estimate a steering torque command $\tau$ for the steering system 140 with the following equations:

$$\tau = G_\delta \delta_f^d + K_P^\delta e_\delta + K_D^\delta \dot{e}_\delta + K_I^\delta \int e_\delta dt \quad (2)$$

$$e_\delta = (\delta_f - \delta_f^d) \quad (3)$$

The steering torque can be a feed forward toque gain $G_\delta$ multiplied by $\delta_f^d$, added to a feed forward proportional gain for steering control $K_P^\delta$ multiplied by a tracking error $e_\delta$, added to feedback derivative gain for steering control $K_D^\delta$ multiplied by a tracking error rate $\dot{e}_\delta$, added to the feedback integral gain for steering control $K_I^\delta$ multiplied by the integral of the tracking error e. The tracking $e_\delta$ can be the front steering angle $\delta_f$ subtracted by the front steering angle command $\delta_f^d$.

According to another aspect of the present disclosure, frequency decomposition may be used to track and make adjustments to the transient and steady state responses of the front steering angle command $\delta_f^d$. The front steering angle command may be adapted with the following equations.

$$\delta_f^d = \delta_{ff}^d + S_{fb}^d = (L + K_{us}V_x^2)\rho_d + K_P e + K_D \dot{e} + K_I \int e \, dt \quad (4)$$

The front steering angle command $\delta_f^d$ may be determined using the feedforward front steering angle command $\delta_{ff}^d$ and the feedback front steering angle command $\delta_{fb}^d$. In other words, the front steering angle command $\delta_f^d$ may be determined by a desired path curvature $\rho_d$ multiplied by the sum of a vehicle wheel base L and a vehicle understeer coefficient multiplied by a vehicle longitudinal velocity $V_X$ squared, added to a feedback proportional gain for lateral position control $K^P$ multiplied by the tracking error e, added to a feedback derivative gain for lateral position control $K_D$ multiplied by a tracking error rate $\dot{e}$, added to a feedback integral gain for lateral position control multiplied by an integral of the tracking error.

$$e = \mathcal{L}^{-1}\left(E(s)\left(1 - G_{hp}\left(\frac{T_{hp}s}{1 + T_{hp}s}\right)\right)\right) \quad (5)$$

$((T_{hp}{}^s)/(1+T_{hp}{}^s))$ is a high pass filter. The high pass filter can allow high frequency oscillations to pass through and filter out low frequency oscillations from a signal. The signal may be multiplied by a gain $G_{hp}$, depending on to what extent it is desirable to suppress high pass oscillations. Then, that resulting value may be subtracted from the original signal. As a result, high frequency oscillations may be filtered and the signal is considered cleaned. Some oscillations of the signal affect yaw rate and lateral position error measurements and make them oscillatory. These measurements may be used by the trajectory control module 152 to calculate steering angle so that the vehicle 100 can follow a path. Thus, if not accounted for, these oscillations may be propagated to the steering control module 154 and make the vehicle 100 wander as it is following the path set forth by the trajectory control module 152.

Figure 5:
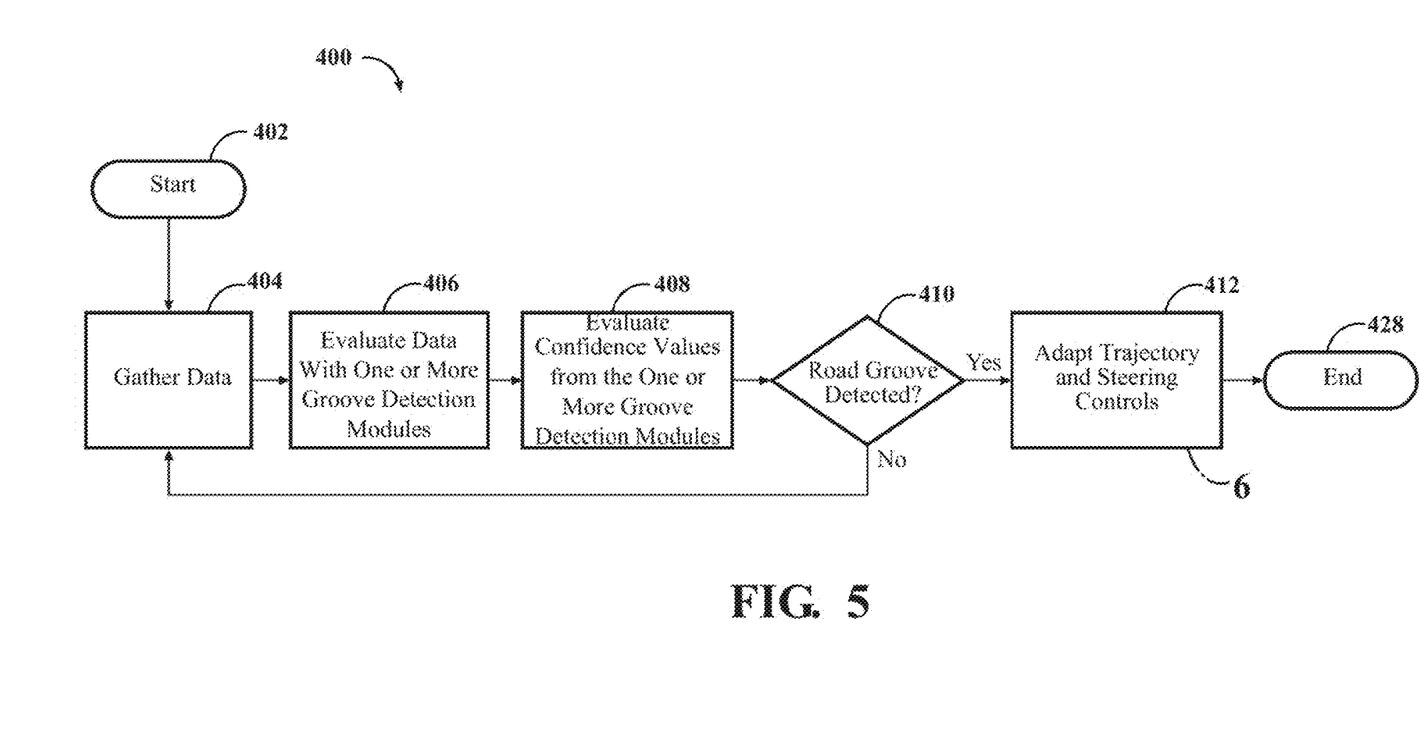
FIG. 5 is a flow diagram of a method of groove detection and wander control according to the principles of the present disclosure.

With reference to FIG. 5, an example flow diagram depicting a method 400 of groove detection and wander control is shown and will be described in more detail below. The method 400 begins at 402. In practical terms, the method 400 begins at 402 when the vehicle 100 is turned on.

At step 404, the sensor data 137 may be gathered by the sensor system 130. As indicated above, the sensor system 130 may include one or more sensor subsystems 132, 134, 136 which gather and provide data 137 to one or more systems of the vehicle management system 110.

At step 406, the sensor data 137 may be evaluated by the one or more road groove detection modules 210, 220, 230.

At step 408, if only one of the road groove detection modules 210, 220, 230 is implemented to determine whether a road groove is present then a single confidence value 212, 222, 230 of any one of the modules may be used to determine whether a road groove exists or not. However, if more than one of the road groove detection modules 210, 220, 230 evaluates the sensor data 137 and there is more than one confidence value 212, 222, 232, the road groove detection fusion module 240 may be used to further evaluate the confidence values 212, 222, 232.

At step 410, the confidence value, whether it be from one of the road groove detection modules 210, 220, 230 or from the road groove detection fusion module 240, may be used to determine whether a road groove is detected or not. If a road groove is detected, the road groove detection data 244 may be communicated to the ADAS 150 for adapting trajectory and/or steering controls of the vehicle 100.

At step 412, road groove detection data 244 may be received at the road groove measurement module 300 of the ADAS 150 so that the trajectory control module and steering control module may adjust and/or adapt the trajectory and steering controls of the vehicle 100. If a road groove is not detected, the method 400 may return to 404 where data continues to be gathered by the sensor system 130.

Figure 6:
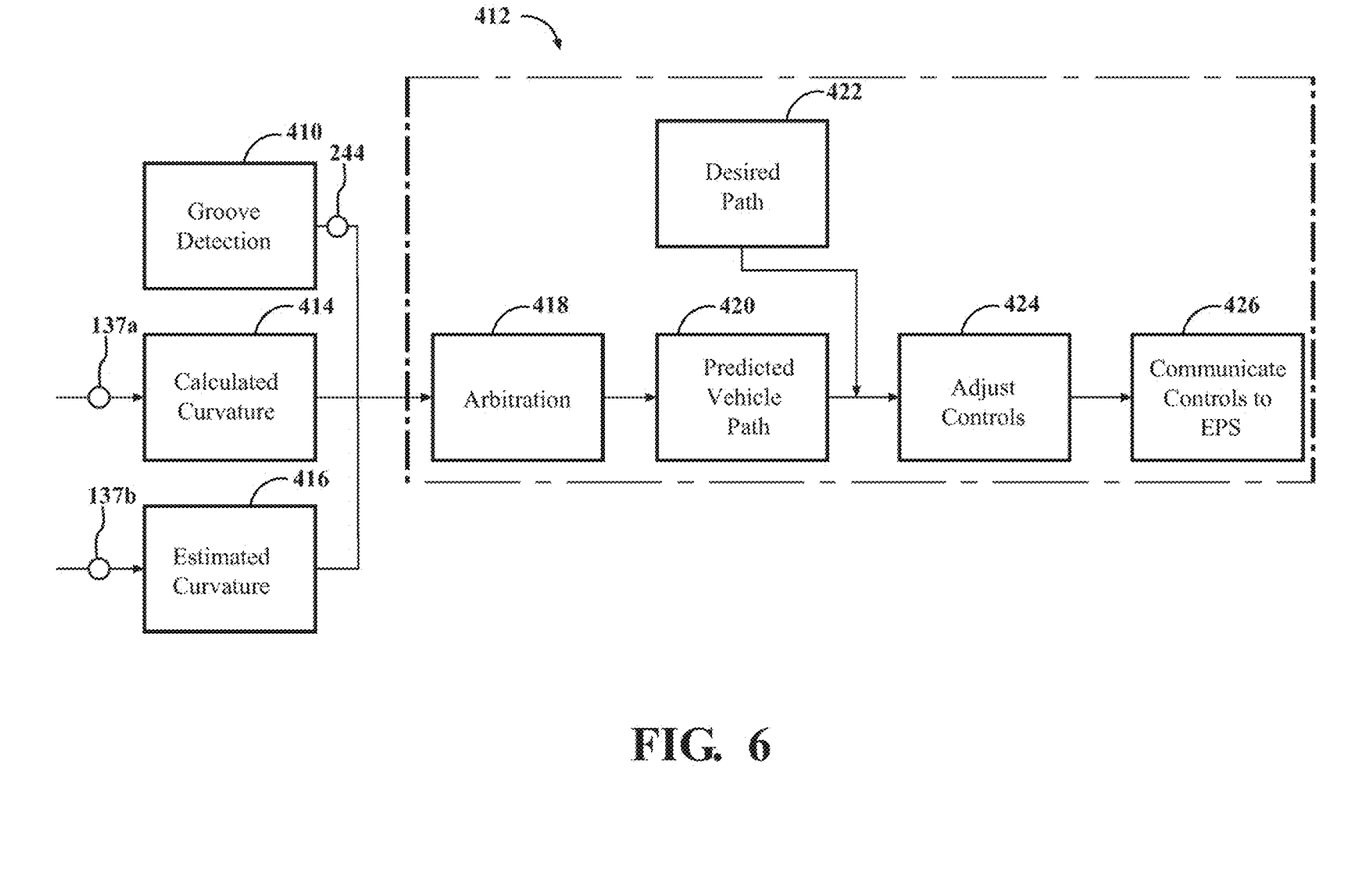
FIG. 6 is a detailed flow diagram of one of the steps of the flow diagram of FIG. 5.

With reference to FIG. 6, a series of sub steps of step 412 may be carried out for adapting trajectory and steering controls of the vehicle 100. At step 418, a calculated curvature 414 based on yaw rate 137a, an estimated curvature 416 based on applied torque 137b, and road groove detection data 244 are received or calculated at the ADAS 150 and are used to determine whether the yaw rate based curvature or the model curvature should be used to develop a predicted vehicle path for vehicle 100. In other words, if a road groove is presented based on the road groove detection data, the estimated curvature 416 may be used to develop the predicted vehicle path for vehicle 100.

At step 420, the predicted vehicle path of the vehicle is calculated based on the estimated curvature 416.

At step 422, a desired path may be calculated based on the desired path curvature pd.

At step 424, the predicted path and the desired path may be utilized by the trajectory control module and the steering control module to generate one or more controls for the steering system. The controls may be further refined by decomposing frequencies of any trajectory error. Additionally, the steady state response of the vehicle 100 and the transient response may be tracked and the transient response may be controlled using micro adjustments. Also, the high pass filter introduced above or another algorithm which cleans or removes certain frequencies of a signal may be applied to one or more signals before being sent to the steering system 140.

At step 426, the electric power steering system may receive and implement the controls in a manner desirable to maintain acceptable trajectory following, for example.

At step 428 (FIG. 5), the method 400 ends.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed by data processing hardware of a vehicle, causes the data processing hardware to perform operations comprising:
   gathering sensor data;
   calculating one or more groove detection confidence values with the sensor data using one or more groove detection modules;
   evaluating the one or more groove detection confidence values using a road groove detection fusion module;
   determining whether a road groove is detected;
   communicating road groove data to an advanced driver-assistance system; and
   adapting trajectory and steering controls of the vehicle.

2. The method of claim 1, wherein the one or more groove detection modules includes a first groove detection module which carries out the steps of:
   measuring applied torque;
   measuring a road wheel angle of the vehicle;
   estimating a self-aligning torque;
   estimating a pull force;
   estimating an asymmetric steering parameter;
   estimating an asymmetric understeer coefficient; and
   calculating a first road groove detection confidence value.

3. The method of claim 2, wherein the one or more groove detection modules includes a second groove detection module which carries out the steps of:
   measuring vehicle dynamic states;
   decomposing frequencies of an inertial measurement;
   classifying the frequencies; and
   calculating a second road groove detection confidence value.

4. The method of claim 3, wherein the one or more groove detection modules includes a third groove detection module which carries out the steps of:
   recording sound in a vehicle environment;
   establishing a circular buffer of the data;
   decomposing frequencies of the recorded sound;
   classifying the frequencies; and
   calculating a third road groove detection confidence value.

5. The method of claim 4, wherein the first, second, and third road groove detection confidence values are evaluated using a road groove detection fusion module to determine whether a road groove is present.

6. The method of claim 4, wherein one or more of the first, second, and third road groove detection confidence values are evaluated to determine whether a road groove is present.

7. The method of claim 1, wherein adapting the trajectory and steering controls of the vehicle further comprises the steps of:
   decomposing frequencies of a trajectory error;
   adapting feedback control;
   tracking steady state response;
   tracking transient response; and
   adjusting the transient response with micro adjustments.

8. A system comprising:
   data processing hardware; and
   memory hardware in communication with the data processing hardware, the memory hardware storing instructions that, when executed on the data processing hardware, cause the data processing hardware to perform operations comprising:
   gathering sensor data;
   calculating one or more groove detection confidence values with the sensor data using one or more groove detection modules;
   evaluating the one or more groove detection confidence values using a road groove detection fusion module;
   determining whether a road groove is detected;
   communicating road groove data to an advanced driver-assistance system; and
   adapting trajectory and steering controls of a vehicle.

9. The system of claim 8, wherein the one or more groove detection modules includes a first groove detection module which carries out the steps of:
   measuring applied torque;
   measuring a road wheel angle of the vehicle;
   estimating a self-aligning torque;
   estimating a pull force;
   estimating an asymmetric steering parameter;

estimating an asymmetric understeer coefficient; and
calculating a first road groove detection confidence value.

10. The system of claim 9, wherein the one or more groove detection modules includes a second groove detection module which carries out the steps of:
measuring vehicle dynamic states;
decomposing frequencies of an inertial measurement;
classifying the frequencies; and
calculating a second road groove detection confidence value.

11. The system of claim 10, wherein the one or more groove detection modules includes a third groove detection module which carries out the steps of:
recording sound in a vehicle environment;
establishing a circular buffer of the data;
decomposing frequencies of the recorded sound;
classifying the frequencies; and
calculating a third road groove detection confidence value.

12. The system of claim 11, wherein the first, second, and third road groove detection confidence values are evaluated using a road groove detection fusion module to determine whether a road groove is present.

13. The system of claim 11, wherein one or more of the first, second, and third road groove detection confidence values are evaluated to determine whether a road groove is present.

14. The system of claim 8, wherein adapting the trajectory and steering controls of the vehicle further comprises the steps of:
decomposing frequencies of a trajectory error;
adapting feedback control;
tracking steady state response;
tracking transient response; and
adjusting the transient response with micro adjustments.

15. A vehicle management system comprising:
a sensor system comprising one or more sensors for gathering sensor data;
a road groove detection system;
an advance driver-assistance system;
data processing hardware; and
memory hardware in communication with the data processing hardware, the memory hardware storing instructions that, when executed on the data processing hardware, cause the data processing hardware to perform operations comprising:
gathering the sensor data;
calculating one or more groove detection confidence values with the sensor data using one or more groove detection modules;
evaluating the one or more groove detection confidence values using a road groove detection fusion module;
determining whether a road groove is detected;
communicating road groove data to an advanced driver-assistance system; and
adapting trajectory and steering controls of a vehicle.

16. The vehicle management system of claim 15, wherein the one or more groove detection modules includes a first groove detection module which carries out the steps of:
measuring applied torque;
measuring a road wheel angle of the vehicle;
estimating a self-aligning torque;
estimating a pull force;
estimating an asymmetric steering parameter;
estimating an asymmetric understeer coefficient; and
calculating a first road groove detection confidence value.

17. The vehicle management system of claim 16, wherein the one or more groove detection modules includes a second groove detection module which carries out the steps of:
measuring vehicle dynamic states;
decomposing frequencies of an inertial measurement;
classifying the frequencies; and
calculating a second road groove detection confidence value.

18. The vehicle management system of claim 17, wherein the one or more groove detection modules includes a third groove detection module which carries out the steps of:
recording sound in a vehicle environment;
establishing a circular buffer of the data;
decomposing frequencies of the recorded sound;
classifying the frequencies; and
calculating a third road groove detection confidence value.

19. The vehicle management system of claim 15, wherein one or more of the first, second, and third road groove detection confidence values are evaluated to determine whether a road groove is present.

20. The vehicle management system of claim 15, wherein adapting the trajectory and steering controls of the vehicle further comprises the steps of:
decomposing frequencies of a trajectory error;
adapting feedback control;
tracking steady state response;
tracking transient response; and
adjusting the transient response with micro adjustments.

* * * * *